United States Patent
Marsh et al.

(10) Patent No.: US 8,433,618 B2
(45) Date of Patent: Apr. 30, 2013

(54) SYSTEMS AND METHODS FOR STREAMLINING THE PROVISIONING OF WIRELESS APPLICATIONS IN AN ORGANIZATION

(75) Inventors: William Marsh, Austin, TX (US); Charles Gamble, Woodbridge, CT (US)

(73) Assignee: Tangoe, Inc., Orange, CT (US)

( * ) Notice: Subject to any disclaimer, the term of this patent is extended or adjusted under 35 U.S.C. 154(b) by 1093 days.

(21) Appl. No.: 11/831,133

(22) Filed: Jul. 31, 2007

(65) Prior Publication Data

US 2008/0052138 A1 Feb. 28, 2008

Related U.S. Application Data

(60) Provisional application No. 60/834,497, filed on Jul. 31, 2006.

(51) Int. Cl.
*G06Q 30/00* (2012.01)
(52) U.S. Cl.
USPC ........................................ 705/26.5; 705/26.82
(58) Field of Classification Search .................. 705/26.5, 705/26.82
See application file for complete search history.

(56) References Cited

U.S. PATENT DOCUMENTS

| | | | |
|---|---|---|---|
| 7,844,263 B2 * | 11/2010 | Marsh et al. ................... | 455/418 |
| 2007/0041532 A1 * | 2/2007 | Salonen et al. ............ | 379/114.2 |
| 2007/0232342 A1 * | 10/2007 | Larocca ........................ | 455/518 |
| 2008/0301231 A1 * | 12/2008 | Mehta et al. .................. | 709/204 |
| 2009/0238349 A1 * | 9/2009 | Pezzutti ...................... | 379/93.02 |
| 2010/0071020 A1 * | 3/2010 | Addington et al. ........... | 725/132 |

OTHER PUBLICATIONS

Leslie Ellis, "Provisioning: What it is, why it matters (part 1)" Multichannel News; Dec 17, 2001; 22, 51; ProQuest Telecommunications p. 30.*

* cited by examiner

*Primary Examiner* — Mark A Fleischer
(74) *Attorney, Agent, or Firm* — St. Onge Steward Johnston & Reens LLC

(57) ABSTRACT

Systems and methods for streamlining the procurement and provisioning of devices, services, and applications are described. At least one embodiment includes a method comprising receiving a request from a member associated with an organization, the request operable to select at least one application to be executed on at least one device, the at least one device configured to operate at least one service; receiving a device selection based on the at least one requested application; receiving a service selection based on the device selection; generating orders to one or more entities, the one or more entities operable to fulfill the device request, service selection, and the application selection; and procuring the at least one device, the at least one device being provisioned with the selected service and the selected application.

26 Claims, 14 Drawing Sheets

SYSTEMS AND METHODS FOR STREAMLINING THE PROVISIONING OF WIRELESS APPLICATIONS IN AN ORGANIZATION

CROSS-REFERENCE TO RELATED APPLICATION

This application claims priority to, and the benefit of, U.S. Provisional Patent Application entitled, "A METHOD FOR STREAMLINING THE PROVISIONING OF WIRELESS APPLICATIONS IN AN ORGANIZATION," having Ser. No. 60/834,497, filed on Jul. 31, 2006, which is incorporated by reference in its entirety.

TECHNICAL FIELD

The present disclosure generally relates to the provisioning of software applications, and more particularly, relates to provisioning of wireless applications for an organization.

BACKGROUND

The procurement and provisioning of a wireless application on an electronic device is a complex multi-step process that can be both time-consuming and expensive and further presents a significant obstacle to the large-scale deployment of complex wireless devices and services within organizations. By way of illustration, reference is made to FIG. 1, which shows a flow diagram for a conventional method typically used by the member of an organization to procure and provision one or more wireless applications. Beginning in step (1), a member of an organization (or someone acting on behalf of the member) conducts research on the mobile devices and then purchases a device. Furthermore, a new service plan for the device is activated. (Alternatively, an existing service plan may be transferred to the purchased device). The member procures a mobile device compatible with the desired applications by using one of several different methods (e.g., going to a retail store, ordering on-line via the Internet, etc.). In step (2), after the member purchases the device, the member then selects and acquires client applications to be executed on the newly procured device.

In step (3), the member (or an application administrator within the organization) installs any client software needed to support the desired application(s). Generally, the member (or third party acting on behalf of that member who will install the client-side software) then provides information regarding the device and the client application software to the application administrator so that the application administrator can perform provisioning on the server side to support the newly installed application(s) (step (4)). In some instances, this may entail physically handing the device to the application administrator for server-side provisioning. Once the server-side provisioning is completed in step (5), the device (with the client application(s) installed) is returned to the member. Next, in step (6), the member undergoes training on how to use the newly installed application. Finally, the application is available for use by the member (step (7)).

Reference is now made to FIGS. 2A-2B, which is a flow diagram illustrating another conventional method for procuring and provisioning wireless applications. Beginning in block 202, a device capable of supporting the desired application(s) is first requested by a member. Furthermore, a service plan is selected. In block 204, a determination is made on whether or not the member already has available the desired service (e.g., carrier circuit switched voice service, carrier data transport services, local area services). If the member does not have the service, then the new service will be requested and the service will be activated for the requested device in block 206. However, if the member already has the desired service, then that service will be transferred to the requested device in block 208.

In block 210, the device is received by the member, and in block 212 a determination is made on whether the member or someone acting on behalf of the member (e.g., a contractor hired by the organization to perform such work, a network administrator, a support person in the organization, an application) must install the application(s). If the member does not need to install the application(s), then in block 214, the member delivers the device to appropriate third party. Alternately, the device can be delivered directly to the appropriate third party, assuming that the member knows who the third party is a priori and has their delivery information (e.g., address). The third party may be an application administrator within the organization, for example. If the application(s) must be installed, then in block 216, any license(s) associated with the software or service required for the application(s) is acquired. In block 218, a determination is made on whether the procured device will actually support the selected application(s). If it is determined that the device cannot support the application(s) due to operating system incompatibility or insufficient memory, for instance, then the device is returned back to the party from which it was acquired (block 220), and the member must restart the process again with a new device.

Reference is made to FIG. 2B, beginning at node A. If the device is capable of supporting the desired application(s), then in block 222, the one or more applications are installed on the device and configured as needed to operate with the appropriate services. If the application(s) requires a corresponding server to operate (e.g., the application is a client-server based application), then in block 224 the application is installed and configured on the corresponding server by the appropriate party. Once the application(s) is fully installed and configured, the application(s) is tested in block 226.

In decision block 228, a determination is made on whether the application(s) was properly installed by a member of the organization. If the application(s) was not installed by a member, then in block 230, the device is returned back to the member without the application(s) installed as an unauthorized installation was attempted. If the application(s) was installed by a member, the member is trained on the use of the application in block 232. Finally, in block 234, other administrative functions associated with the procurement and provisioning of applications such as financial accounting of costs associated with the device, costs for service activation, and costs for the installation of application(s) (e.g., client access licenses) are completed.

As seen from FIGS. 1 and 2A-2B, conventional approaches by which organizations procure and provision wireless applications is generally inefficient and has the potential for error. For example, if the member fails to perform adequate research to determine the compatibility of the device with the application(s) to be installed, the member may potentially purchase an incompatible device. If this occurs, the incompatible device must be returned for a compatible one. A compatible device will then have to be procured and provisioned. As another example, once a compatible device is procured, the member may need to acquire client software needed to support the device and then install this software. The member must coordinate the provisioning of the device with the server software with the application administrator in order to affect the end-to-end provisioning of the application. Depending upon the workload of the administrator, a significant period of time can pass before the request is completed. Finally, another apparent shortcoming is that a member might need to acquire the necessary training materials and/or arrange for the necessary training in order to use the applications installed on the device.

Thus, a perceived shortcoming with conventional approaches is that methods currently used by telecom and IT departments within organizations to procure and provision such wireless applications are complex, time-consuming, and expensive. Furthermore, the burden of procuring and provisioning falls on the procurer (i.e., member or someone acting on behalf of the member) and the administrator. Consequently, conventional methods represent a significant impediment to large-scale deployment of wireless applications. Therefore, there is a need in the industry to overcome these deficiencies and inadequacies of current wireless application deployment methods to better streamline the process of procuring and provisioning these wireless applications.

SUMMARY

Briefly described, one embodiment, among others, includes a method for provisioning applications for a device. The method comprising receiving a request from a member associated with an organization, the request operable to select at least one application to be executed on at least one device, the at least one device configured to operate at least one service; receiving a device selection based on the at least one requested application; receiving a service selection based on the device selection; generating orders to one or more entities, the one or more entities operable to fulfill the device request, service selection, and the application selection; and procuring the at least one device, the at least one device being provisioned with the selected service and the selected application.

Another embodiment includes a system for provisioning applications for a device, where the system is configured to receive a request from a member, the request operable to procure at least one device, the at least one device configured to operate at least one service, the device further configured to execute at least one application. The system is further configured to receive a service selection and an application selection from the member.

Yet another embodiment includes a system for provisioning applications for a device comprising means for receiving a request from a procuring entity at a provisioning management module, the request operable to procure at least one device, the at least one device configured to operate at least one service, the device further configured to execute at least one application. The system further comprises means for receiving a service selection and an application selection from the procuring entity at the provisioning management module, means for generating orders to one or more entities at substantially the same time, the one or more entities operable to fulfill the device request, service selection, and the application selection, and means for procuring the at least one device, wherein the at least one device is provisioned with the selected service and the selected application.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
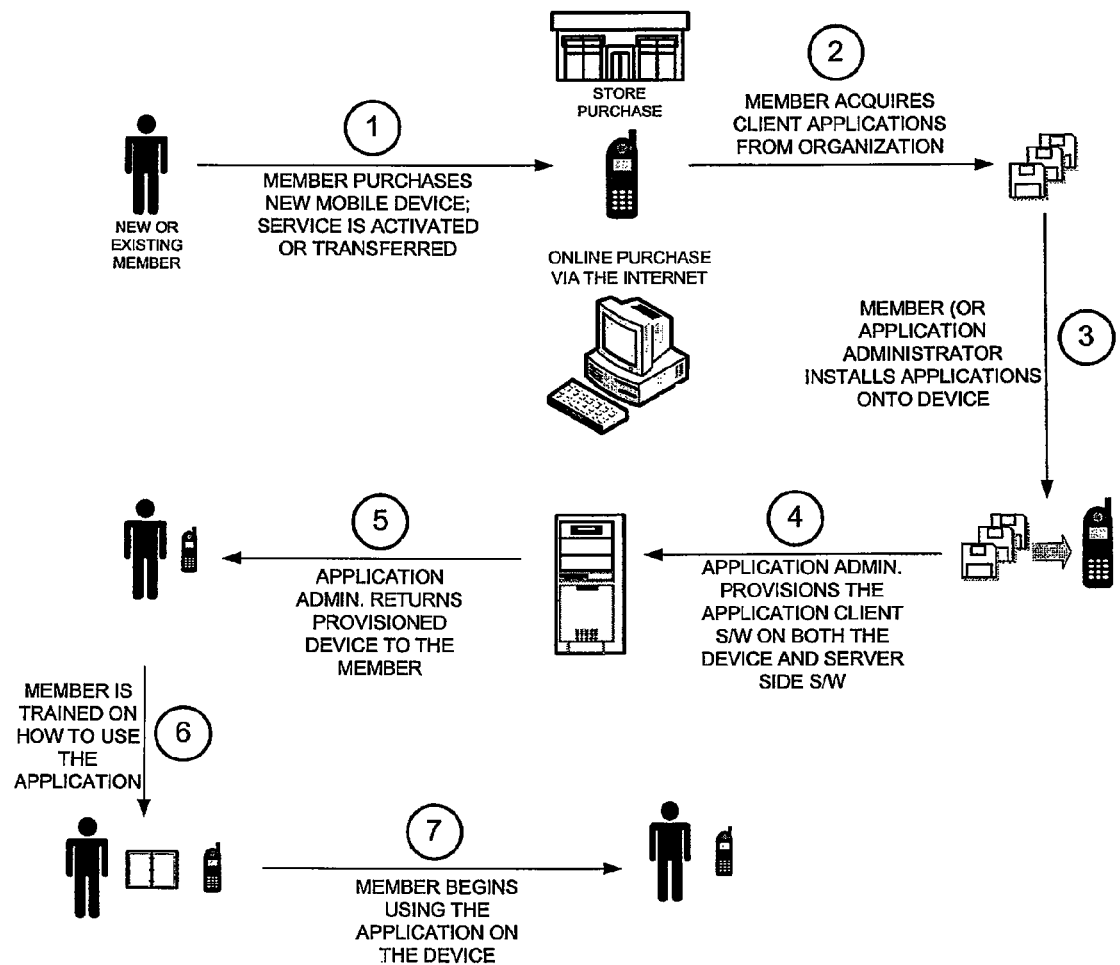
FIG. 1 is a flow diagram illustrating a conventional method for procuring and provisioning wireless applications.
Figure 2A:
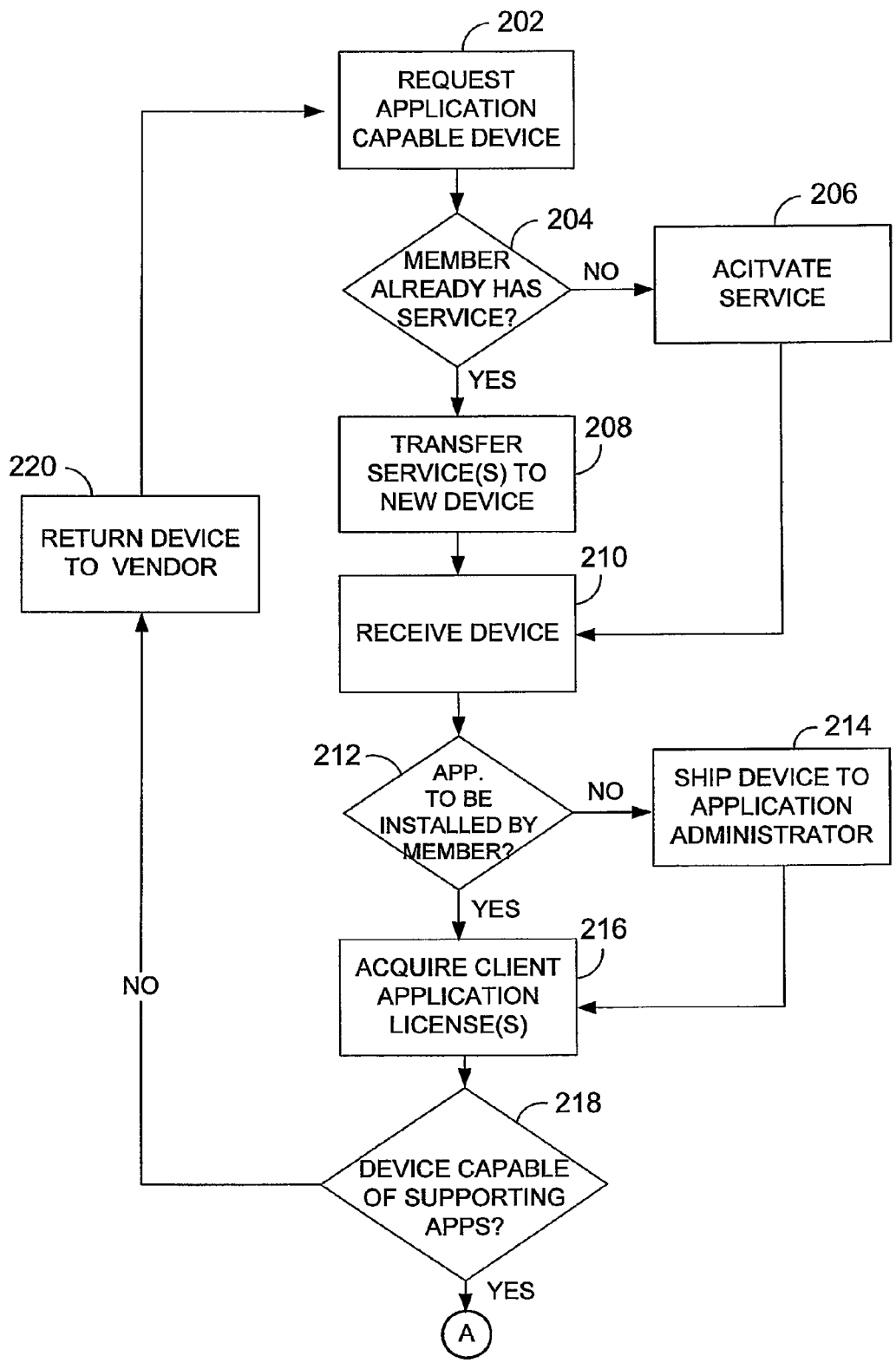
FIGS. 2A-2B depict a flow diagram illustrating another conventional method for procuring and provisioning wireless applications.
Figure 2B:
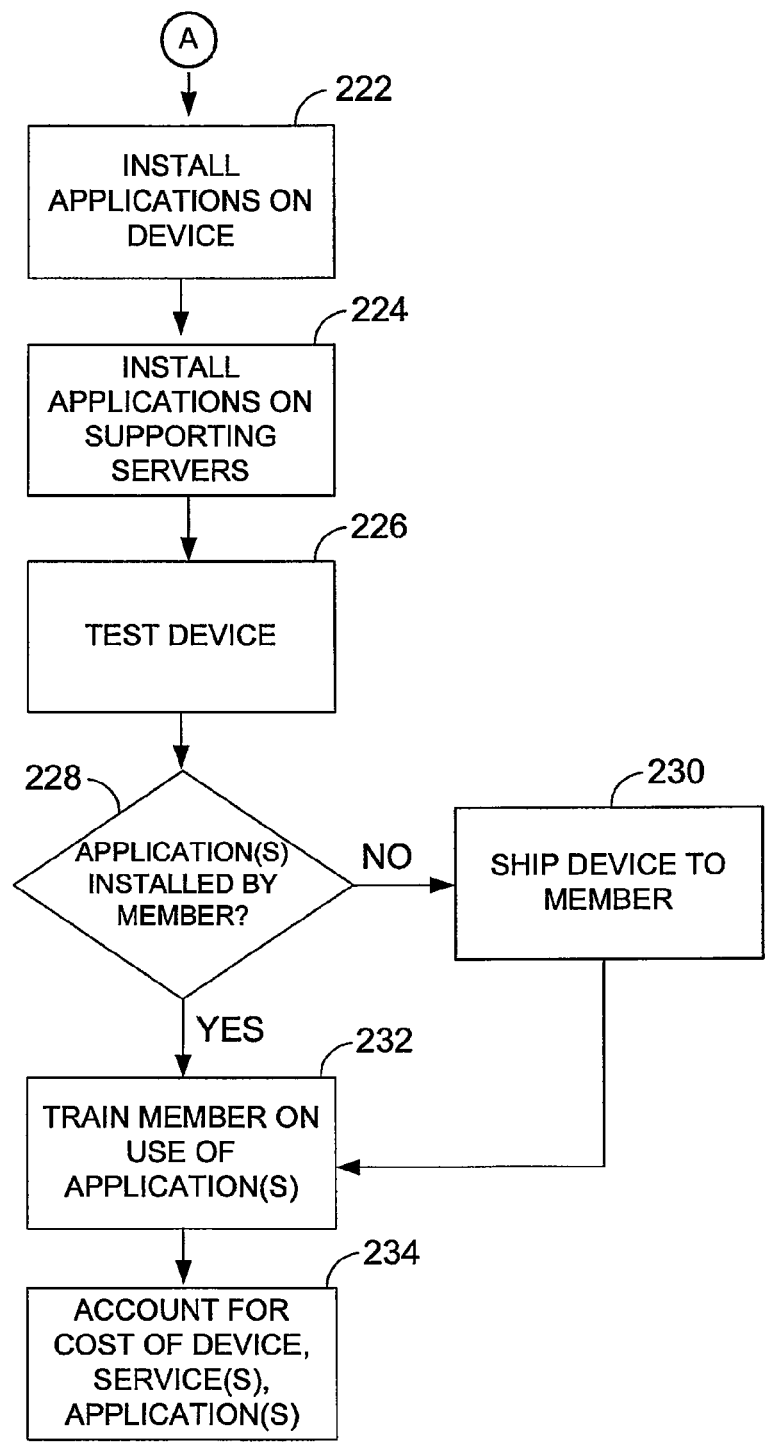

Disclosed herein are various embodiments of systems and methods for streamlining the process of procuring and provisioning devices, services, and applications, thereby increasing the likelihood of successful large-scale wireless application deployment within an organization. For purposes of nomenclature used herein, an organization generally refers to a group with one or more members sharing a common interest (e.g., a family, club, proprietorship, partnership, corporation, governmental agency, etc.), and a member (or procuring entity/procurer) generally refers to a member or employee of an organization, business, family, or other group of users who seeks to procure a user device and seeks to provision one or more applications for that particular device. A user device may include, but is not limited to, one of the following: a device adapted for wireless local area only service, a device adapted for wireless wide area only service, or a Fixed-Mobile Converged (FMC) device adapted for wireless local area network (WiLAN) service and wireless wide area network (WiWAN) service. Furthermore, for certain embodiments, the user device is a device capable of being configured for various types of services. As non-limiting examples, the device may be configured for wireless services, land-line telecommunications services, television services, data services, music services, and gaming services. Generally, applications refer to any type of license software or software as a service designed for operation on a device. Non-limiting examples of applications include: corporate e-mail software, software used for tracking inventory, and web browsers.

To more efficiently perform large-scale deployment of applications on such user devices, particularly within an organization, embodiments described herein address various perceived shortcomings of conventional methods for procuring and provisioning wireless applications. Specifically, the systems and methods described herein reduce the number of steps as well as the complexity of the overall process for procurement and provisioning. The present disclosure describes improved methods for provisioning a user device, installing one or more applications, and installing one or more services concurrently while the user device is being procured. It should be emphasized that although the disclosure refers at times to a single user device, application or service, the disclosed embodiments may be incorporated for a plurality of devices, applications, and servers.

Furthermore, computer programs are disclosed herein for transacting the procurement and provisioning of the device to accommodate multiple applications and services. The computer programs may also include logic for configuring the device for compatibility with and among the applications and services. The following description includes exemplary embodiments designed to simplify the procurement and provisioning methods and to promote a more desirable deployment process for deploying multi-application and multi-service devices to members.

Figure 3:
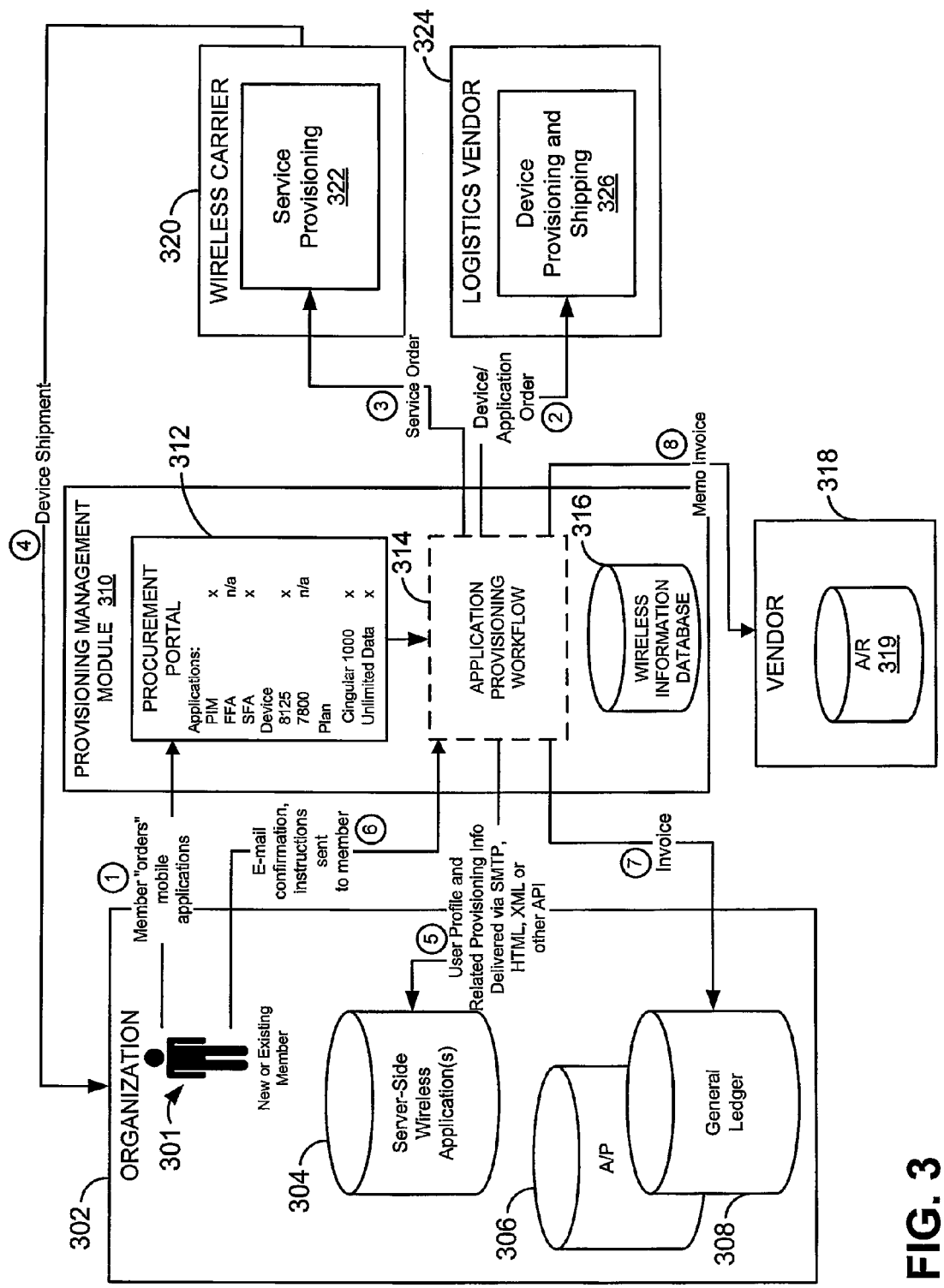
FIG. 3 shows a data flow diagram illustrating operation of an embodiment of a system for performing procurement and provisioning of wireless applications for a corresponding compatible device.

Reference is now made to FIG. 3, which shows a data flow diagram illustrating operation of an embodiment of a system for performing procurement and provisioning of wireless applications for a corresponding compatible device. It should be emphasized that FIG. 3 illustrates a less complex, streamlined process for procuring devices and provisioning wireless applications. Generally, a member/procurer within an organization first communicates with a provisioning management module 310. The member 301 utilizes the provisioning management module 310 to procure one or more applications.

The provisioning management module 310 generates subscriber and system profile information required for provisioning a selected device for selected applications and services. The provisioning management module 310 then forwards the profile to a "fulfiller(s)" (or fulfilling entity(ies)) which receives the necessary device profile information required to provision the applications on the device. The fulfiller(s) can be any suitable entity for fulfilling an order for a device or services. As non-limiting examples, the fulfiller(s) may be a wireless service carrier, a device vendor, a logistics vendor, an agent, the member himself or other members within the organization, etc.

If the member 301 has any existing services, the fulfiller(s) activates or transfers the services to the selected device and installs the necessary client software needed to implement the requested applications onto the device. It should be appreciated that the task flow shown in FIG. 3 provides an optimized process compared to the complex procedures utilized in conventional approaches. It should be noted that the simplified task flow shown in FIG. 3 may be used as a business model for simplifying the procuring process for wireless applications and address various perceived shortcomings with conventional approaches. It should also be emphasized that the task flow in FIG. 3 provides a fully provisioned device to the member 301 in a timely manner when compared to conventional approaches. Other benefits may become apparent to one of ordinary skill in the art to make the procurement process simpler for the member/procurer. The steps outlined above are now described in more detail.

Beginning in step (1), a member 301 of an organization 302 first interfaces with a provisioning management system 310, which allows the member 301 to select a device and a service plan. The provisioning management system 310 also allows the member 301 to select wireless applications to be installed onto a selected device. A check is performed on the member 301 to generate a list of wireless applications to which the member 301 is eligible to gain access to. Eligibility may be based on such criteria as the member's position, title, or other rules defined by the organization 302. Furthermore, a list of devices which are compatible with the eligible application(s) is generated. As with the list of applications, the list of devices may be restricted to devices which the member 301 is eligible to select from.

Once the member 301 selects a device, a list of wireless services which supports the particular device selected is displayed from which the member 301 can select. A request for procuring and provisioning the device and selected services and applications is then ready to be transmitted. For certain embodiments, the organization 302, may require that the combined application-device-carrier request first be routed to appropriate parties within the organization 302 for approval before the request is actually routed to entities (i.e., fulfillers) to fulfill the request. It should be noted that for certain embodiments, this provides an audit trail, which may later be examined to show that the organization has proper controls implemented for accounting purposes, for example.

Once the request is approved within the organization 302, the request may be divided into various transactions necessary to complete the procurement and provisioning of the device, service, application combination. It should be noted that for exemplary embodiments, the request is divided into multiple transactions so that the transactions may be executed concurrently or in a substantially concurrent manner, thereby speeding up the procurement/provisioning process. In step (2), for instance, an order for the selected application is sent to a logistics vendor 324. Any client software required for the selected applications will then be installed on the device by the logistics vendor 324. In step (3), a separate transaction request for activating a new service (or for transferring existing service) along with any necessary device-specific information required for provisioning will be forwarded to or directly executed by the selected wireless carrier 320. In turn, the wireless carrier 320 will provide the logistics vendor 324 with any information required by the device to allow it to be registered with the wireless carrier 320. The fully provisioned device will then be shipped to the member 301 in step (4) so that the member 301 may utilize the device.

Once the device, applications, and carrier services have been procured and provisioned and the information is sent to the provisioning management module 310, any server-side configuration that is required will be performed in step (5). In some embodiments, this may be performed directly by a corresponding server-side application interface or by forwarding the information to appropriate application administrators 304. For such embodiments, provisioning data such as user profile data may be delivered through such means as SMTP (Simple Mail Transport Protocol). Alternatively, the user profile data may be transported as an HTML (Hyptertext Markup Language) file, an XML (Extensible Markup Language) file, or by some other API (application programming interface). It should be emphasized that at the same time, instructions or training manuals for using the selected applications can be sent to the member 301 by electronic means (e.g., e-mail) or other means (step (6)).

Finally, all financial transactions associated with the procurement and provisioning process (e.g., device purchase costs, initiation fees for service agreements, fees associated with acceptance of software licenses) are recorded at both the organization 302 and at the respective vendors 318 where accounts receivable (A/R) transactions 319 may be generated, for example. For some embodiments, this information is transmitted to the vendor 318 in the form of a purchase order. Within the organization 302, an invoice may be received for the fees associated with the procurement/provisioning process and entered into a general ledger 308 and may be recorded as an account payable (A/P) 306. It should be noted that for certain embodiments, the organization captures allocation tracking information (e.g. cost centers) and sends this information to financial systems so when invoices are received, they invoices can be properly allocated.

Figure 4:
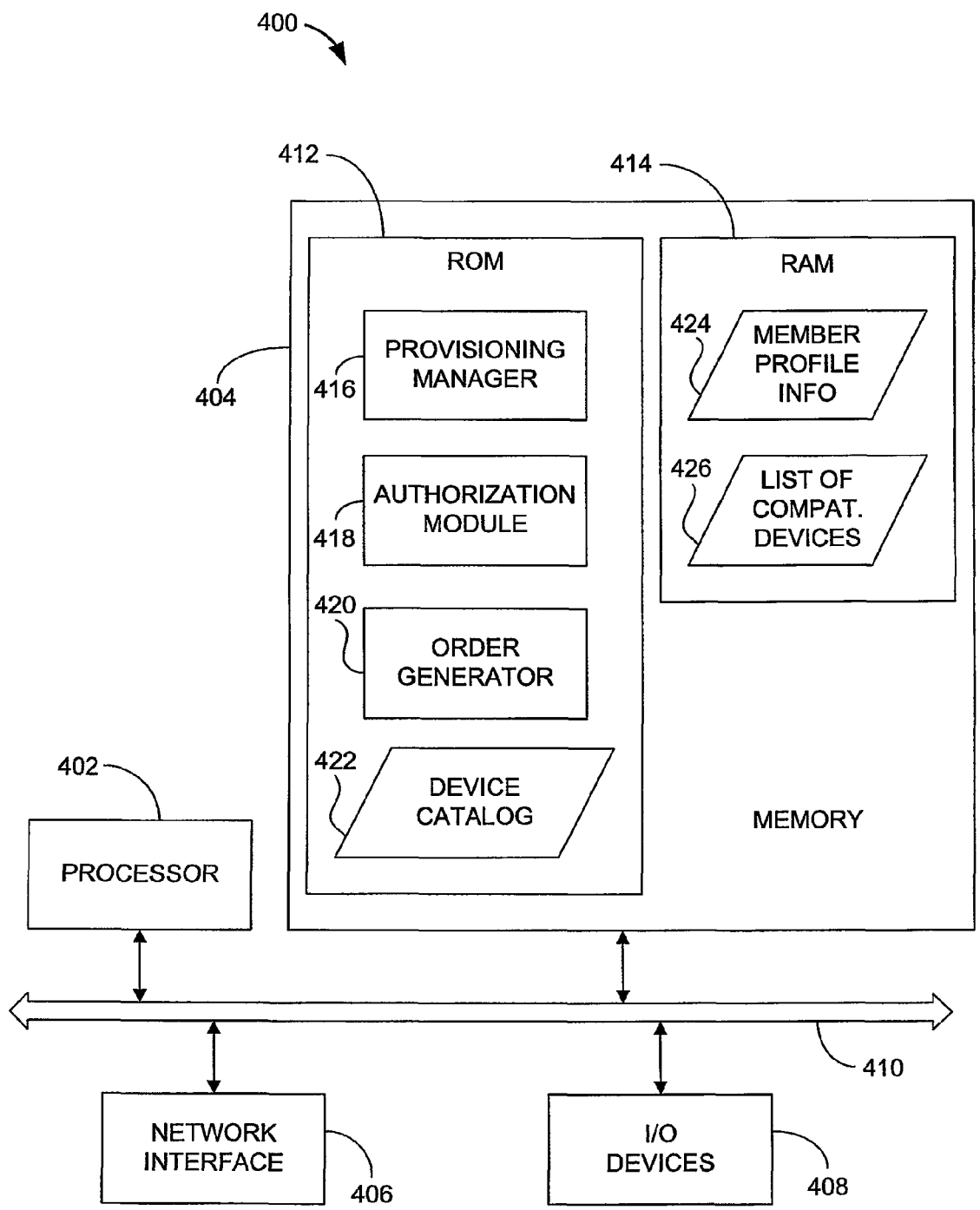
FIG. 4 is a block diagram illustrating an embodiment of the provisioning management module shown in FIG. 3.

Reference is now made to FIG. 4, which is a block diagram illustrating an embodiment of the provisioning management module shown in FIG. 3. The provisioning management module 400 is configured to perform procurement and provisioning of services and applications on a device. Specifically, the provisioning management module 310 is responsible for performing and supervising the application provisioning workflow 314 shown in FIG. 3.

For exemplary embodiments, the provisioning management module 400 includes, among other things, a processor 402, memory 404, a network interface 406, and input/output devices 408, each connected to an internal bus 410. The memory 404 includes, among other things, a read-only memory (ROM) component 412 and a random access memory (RAM) component 414. The ROM component 412 includes, among other things, a provisioning manager 416, an authorization module 418, order generator 420, and a device-application-service catalogue 422. The RAM component 414 includes, among other things, a member profile information register 424 and a compatible devices register 426.

The processor 402 generally controls the operations of the provisioning management module 400 and executes software stored in the memory 404. The provisioning manager 416 of memory 404 includes logic or software for managing the provisioning of a member device for applications and services. Details of the operations and functions of the provisioning manager 416 are described more fully below. The network interface 406 provides a communication path between the provisioning management module 400 and a network (not shown), such as the Internet. In this regard, the provisioning management module 400 can communicate with a member or procurer, who can access the provisioning management module 400 when necessary. The I/O devices 408 of the provisioning management module 400 may include, for example, various peripheral devices, such as computer monitors, printers, keyboards, etc., allowing communication with a system operator or other administrator who operates or maintains the provisioning management module 400.

For certain embodiments, the provisioning management module 400 can be placed in any suitable facility or location where the network interface 406 can properly communicate with the network. In this way, the network interface 406 can be associated with a web address or URL, for example, and the member or procurer can provide requests via the network interface 306. In some embodiments, the network interface 406 is omitted from the provisioning management module 400. In this latter case, the system operator or administrator can manually enter data received from the member or procurer by way of other input mechanisms or methods, such as by telephone, facsimile, e-mail, etc.

The provisioning management module 400 can be implemented in association with the Internet or the World Wide Web. Alternatively, instead of implementing the provisioning management module 400 via use of the Internet or the World Wide Web, the device may be implemented via use of a first transmitting and receiving device such as, but not limited to, a modem located at a customer premises, which is in communication with a second transmitting and receiving device such as, but not limited to, a modem located at a central office. In accordance with such an embodiment, personal computers may be located at the customer premises and the central office having logic provided therein to perform functions in accordance with the provisioning management module 400.

Furthermore, the provisioning management module 400 and provisioning manager 416, in whole or in part, can be implemented in software, hardware, or a combination thereof. In some embodiments, the provisioning manager 416 is implemented in software or firmware and stored in memory 404 of the provisioning management module 400. In this respect, the provisioning manager 416 is executed by a suitable execution system, such as processor 402. If implemented in hardware, as in alternative embodiments, the provisioning manager 416 can be implemented with any combination of discrete logic circuitry or as an application-specific integrated circuit (ASIC), programmable gate array (PGA), field programmable gate array (FPGA), etc.

The provisioning manager 416, when implemented in software, can be stored on any suitable computer-readable medium for use by or in connection with an instruction execution system, apparatus, or device, such as a computer-based system, processor-containing system, or other system. In the context of the present disclosure, a "computer-readable medium" can be any means that can contain, store, communicate, propagate, or transport the program for use by or in connection with the instruction execution system, apparatus, or device. The computer-readable medium, for example, may be magnetically stored and transported on a conventional portable computer diskette. The computer-readable medium can be, for example but not limited to, an electronic, magnetic, optical, electromagnetic, infrared, or semiconductor system, apparatus, device, or propagation medium.

It should be noted that the provisioning management module 400 can be configured to provide provisioning service to any number of clients via client servers, processors, etc. As a non-limiting example, if five separately located clients utilize the provisioning management module 400, five separate client processors may be connected to a single client server, or five separate client servers. The client processor(s) may be any suitable device, such as a personal computer, laptop, workstation, or mainframe computer, for accessing the provisioning management module 400. Furthermore, the network interface 406 may be configured with security and encryption hardware and/or software for the purposes of ensuring the confidentiality of information transmitted within and between the respective networks.

A procurement request for wireless devices, wireless applications and wireless services can be made via a procurement request form, such as one rendered via the Internet or using other electronic mechanisms. In some embodiments, requests can be made by voice commands or by using paper forms mailed or transmitted via facsimile to a facility that houses the provisioning management module 400. The received request can be entered automatically into the provisioning management module 400 or entered manually using input devices 308. In this regard, it should be emphasized that the procurement and provisioning steps disclosed herein may be performed manually or in an automated fashion. Referring back briefly to FIG. 3. In some embodiments, the procurement request may be entered by a member 301 via a procurement portal 312, as shown in FIG. 3. For such embodiments, the member 301 may simply log into a web portal through the Internet to specify the device along with the desired services and applications.

Referring back to FIG. 4, the processor 402 executes the provisioning manager 416 and analyzes procurement requests to determine the compatibility, viability, and/or validity of the requested elements, including, but not limited to, parameters, characteristics, limitations, etc. of the user device, applications, wide area service provider, and/or local area service provider or infrastructure. Once compatibility has been verified, the processor 402 routes the device/services request for approval to an appropriate entity. In some embodiments, the entity may be specified in a table or database correlating various compatibility parameters. If the request is approved, the request is split into multiple provisioning requests. As a non-limiting example, one request may be generated to order a selected user device. Other requests may correspond to, for example, a specific application configuration on a server, a wireless wide area service, a wireless local area service, or other types or numbers of multiple services.

In some embodiments, the provisioning management module 400 can be combined or incorporated with service plan optimization systems. Further details regarding service plan optimization systems are disclosed in U.S. patent application Ser. No. 09/758,816, entitled "SYSTEM AND METHOD FOR ANALYZING WIRELESS COMMUNICATION RECORDS AND FOR DETERMINING WIRELESS COMMUNICATION SERVICE PLANS", filed Jan. 11, 2001, now U.S. Pat. No. 6,681,106, herein incorporated by reference in its entirety.

As shown in FIG. 4, the present disclosure further described computer software and programs for providing instruction for provisioning a user device. In one embodiment a computer program is stored on a computer-readable medium for execution by a processing device. The computer program, in this embodiment, comprises logic that allows a first request to be received at a centralized location, logic that allows a second request to be received at the centralized location, and logic that allows a third request to be received at the centralized location. The program also includes logic configured to coordinate the first request, second request, and third request. The first request is associated with an electronic device, the second request is associated with application(s) being assisted by the electronic device, and the third request is associated with service(s) being assisted by the electronic device.

Figure 5:
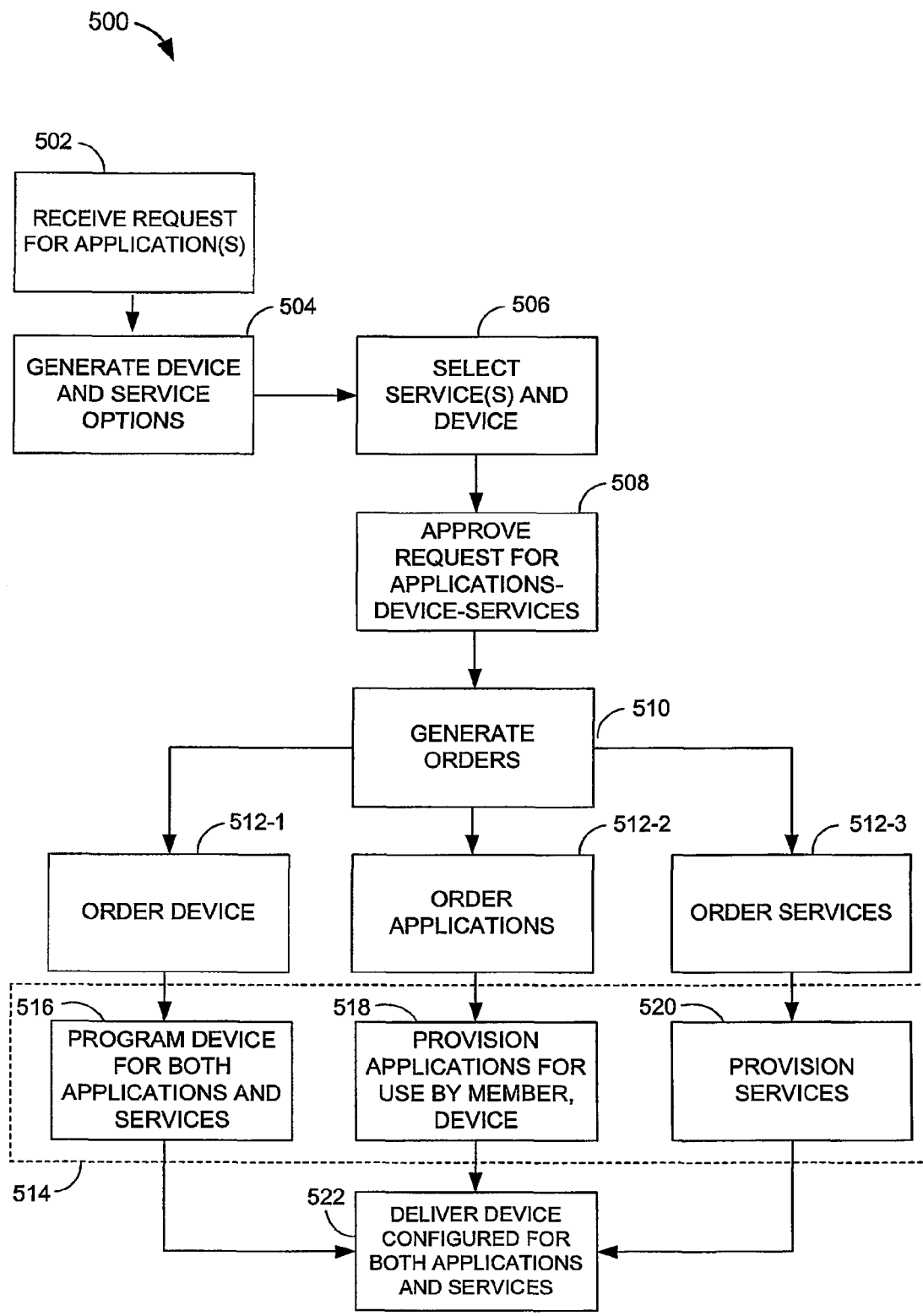
FIG. 5 is a flow diagram illustrating another embodiment of a method or business method for utilizing the provisioning management module in FIG. 3.

FIG. 5 is a flow diagram of an embodiment of a method, such as a business method, which can be performed in whole or in part by the provisioning management module in FIG. 4. The method 500 includes receiving a request for wireless application(s), as indicated in block 502. Block 504 includes generating device and service options for the procurer based on the applications requested. In block 506, a selection of a user device and service(s) is received. In response to the device and application selections received in blocks 502 and 506, the method 500 includes automatically determines whether or not the request for the application(s), device and service(s) is approved, as indicated in block 508.

Upon receiving approval in block 508, block 510 is executed, and orders for the user device, applications and services are generated. At this point, orders are routed to separate entities at the same time (or substantially the same time) in order to coordinate orders and responses to the orders, thereby achieving procurement of the user device in a time-efficient manner.

For some embodiments, a first order is generated by the order generator 420 in FIG. 4 and sent as a device order (block 512-1), a second order is sent as an order for provisioning of the selected application(s) (block 512-2), and a third order is sent as an order for service(s) (block 512-3). It should be recognized that generating orders associated with block 510 may include the orders 512-1, 512-2, and 512-3, as illustrated, or may include, in alternative embodiments, additional or different types of orders depending on the particular application. If additional services are to be provisioned in addition to local and wide area services, for instance, then additional orders are sent to the appropriate entities to fulfill the orders. Furthermore, the orders 512-1, 512-2, 512-3 may be sent to one or more entities, depending on the device, service, and application(s) selected.

In response to the various orders 512-1, 512-2, 512-3, block 514, which comprises blocks 516, 518, and 520, includes the step of fulfilling the orders. It should be emphasized that the orders are fulfilled at substantially the same time or in any suitable sequence to properly provision the application(s) in a timely manner. In block 516, the user device is programmed for the applications and services requested. In block 518, the applications are provisioned based according to order 512-2. In block 520, the services are provisioned according to order 512-3.

Once the user device has been provisioned for the selected applications and services have been ordered and provisioned, the user device is shipped to the member 522, which in turn initiates three (3) additional steps 524, 526, 528. In block 524, the member is provided a set of instructions (user manual(s), quick-start guides, access to in-person or on-line training services, etc.) for the device(s), service(s) and application(s) that have been requested, approved and fulfilled. In block 526, any server-side configuration within the organization required to enable or otherwise activate the provisioned device(s), service(s) and application(s) is performed. At this point, the member can begin using the user device according to the application(s) and service(s) ordered. In block 528, all accounting for the device(s), service(s) and application(s) is performed, both within the organization and with the vendors involved in the process. Since no additional tasks are required for provisioning the user device at this point, the business method 500 provides the member with a fully provisioned device that can be used upon receipt, instead of requiring additional, and sometimes frustrating, tasks and/or delays as is common in conventional business methods.

Figure 6:
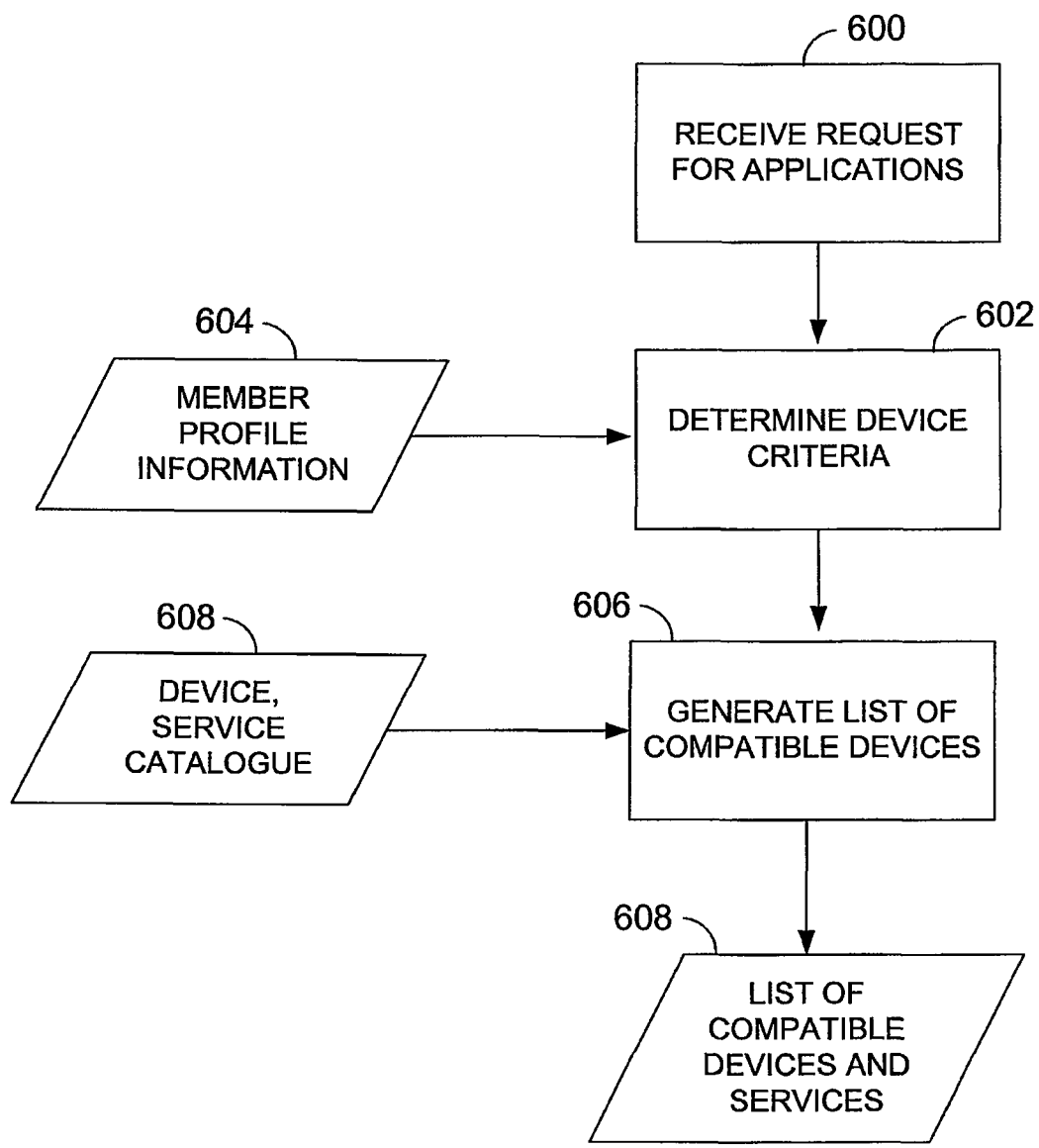
FIGS. 6-13 are flow charts and block diagrams of selected steps shown in FIG. 5 to more clearly define possible implementations of the individual steps.

It should be emphasized that the business method in FIG. 5 includes steps or processes that can be modified without departing from the spirit and scope of the present disclosure. By centralizing the provisioning process for a wireless application, the process can be simplified for procurers and other administrative staff members. In this regard, by utilizing the method of FIG. 5, members of businesses, schools, government agencies, households, and other entities can more easily provision wireless applications without the usual complexity common today. It should be recognized that each step or process of FIG. 5 can be performed in a variety of ways. As non-limiting examples, FIGS. 6-13 provide flow charts and block diagrams of selected steps shown in FIG. 5 to more clearly define possible implementations of the individual steps. FIG. 6 is a flow diagram of an embodiment of the device option generating step 504 shown in FIG. 5. In response to receiving a request for an application (block 600), block 602 includes determining user device criteria, based on member profile information 604. This may be performed through the authorization module 418 in FIG. 4. As non-limiting examples, member profile information 604 may include limiting criteria such as member location, member authority/status within the organization, and other criteria that might limit the device and service choices. In block 606, a list of compatible devices is generated based on the application criteria. This list is also generated based on available devices and in an application device-service catalogue 608, for example. The list of compatible devices and services 610 is stored for later selection.

Figure 7:
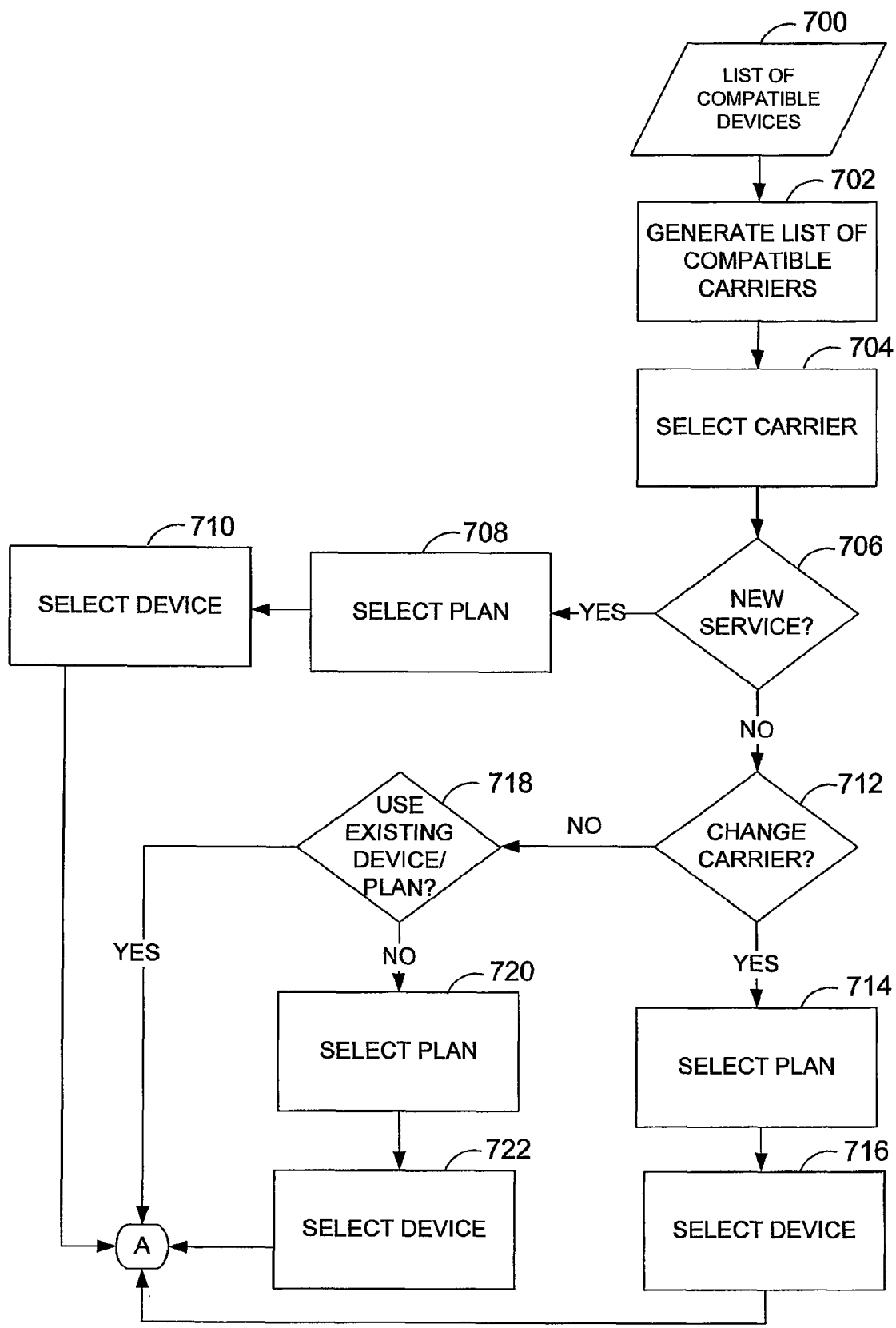

FIG. 7 is a flow diagram of an embodiment of the selection receiving step 506 shown in FIG. 5. In this embodiment, the list of compatible devices 700 is provided to block 702, where the list of compatible carriers is generated. In block 704, a carrier (which could include the organization itself as in the case of a local area network or premise-based communications service such as a PBX) is selected. In decision block 706, it is determined whether or not a wide area service plan for selection is a new service. If the service plan is new, the flow diagram proceeds to block 708, at which time a service plan is selected. Also, a device is selected as indicated in block 710. If the selected, service is determined in block 706 to be an existing service, then flow proceeds to decision block 712, at which time it is determined whether or not a selected carrier is changed from a previous service. If the carrier has changed, flow proceeds to block 714, in which a service(s) is selected, and block 716, in which a device is selected. If it is determined in block 712 that the carrier is not changed, then flow proceeds to decision block 718. In block 718, it is determined whether or not an existing device or plan is being used. If so, no further steps are performed for making selections. If an existing device or plan is not used, then flow proceeds to block 720, in which a service(s) is selected, and block 722, in which a device is selected.

Figure 8:
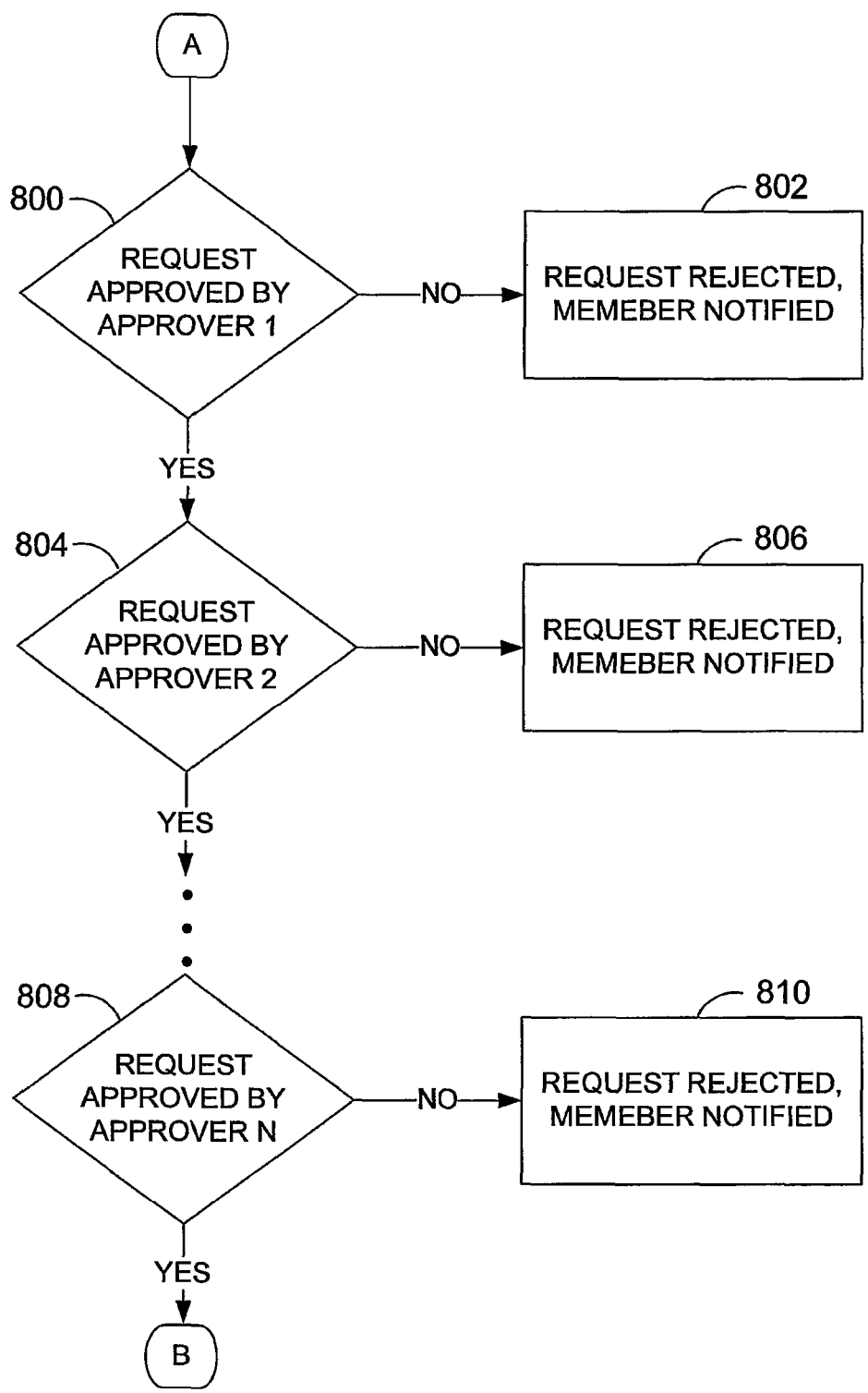

FIG. 8 is a flow chart illustrating an embodiment of the approval step 508 shown in FIG. 5. Selections for application (s), a user device, and associated services to be provided by way of the user device may require approval. In some embodiments, approval for certain devices and/or services may be incorporated within the selection process itself. In this respect, the selection of application(s), devices and/or service (s) is limited by member information that may be known at the time of selection. Approval may depend on various criteria and may require checking with different administrators. It should be noted that while the steps described above are executed serially, the steps in the approval process can be performed in parallel as well.

In the embodiment of FIG. 8, decision block 800 includes determining if the request for selections is approved by a first approver. The first approver may be a person, such as an administrator, or an automatic response mechanism. If the request is not approved, then flow goes to block 802, which indicates to the procurer that the request has been rejected. Block 804 includes determining whether or not the request is approved by a second approver. If not, the procurer is notified that the request was rejected. Approval is checked for any number N of approvers. In this embodiment, a decision block 808 includes determining whether the request is approved by the last approver. If the request passes all levels of approval, flow proceeds to the order generating step 510 shown in FIG. 5.

Figure 9:
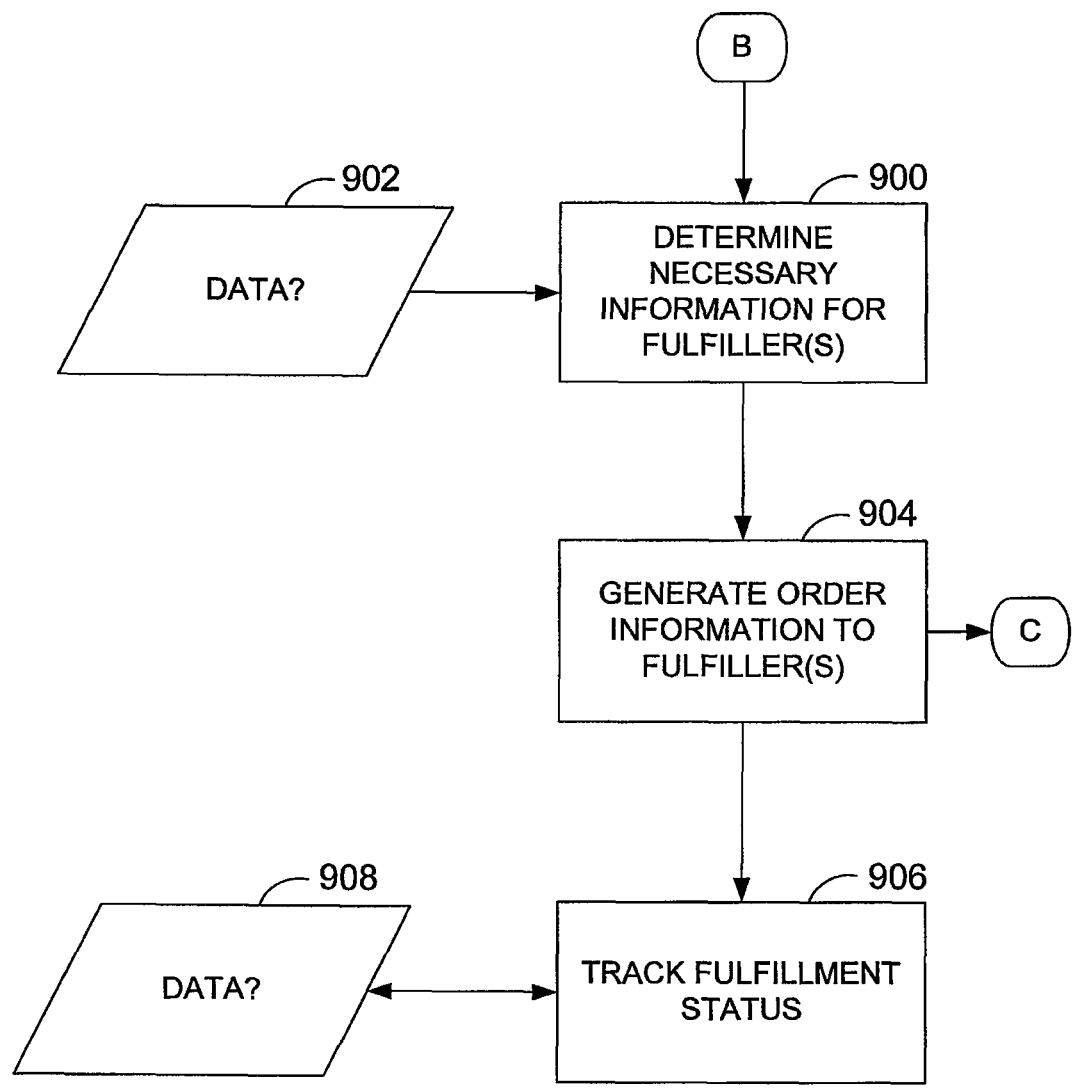

FIG. 9 is a flow diagram of an embodiment of the order generating step 510. In this implementation, the information necessary to be sent to the fulfiller(s) for fulfillment is determined as indicated in block 900. The necessary information can be extracted from a database that stores the relevant data 902. In block 904, the order information to be sent to the fulfiller(s) is generated. At this time, the generated order of block 904 is tracked in block 906 to determine the status of fulfillment of the order. Other data 908 may be used to track the fulfillment status.

Figure 10:
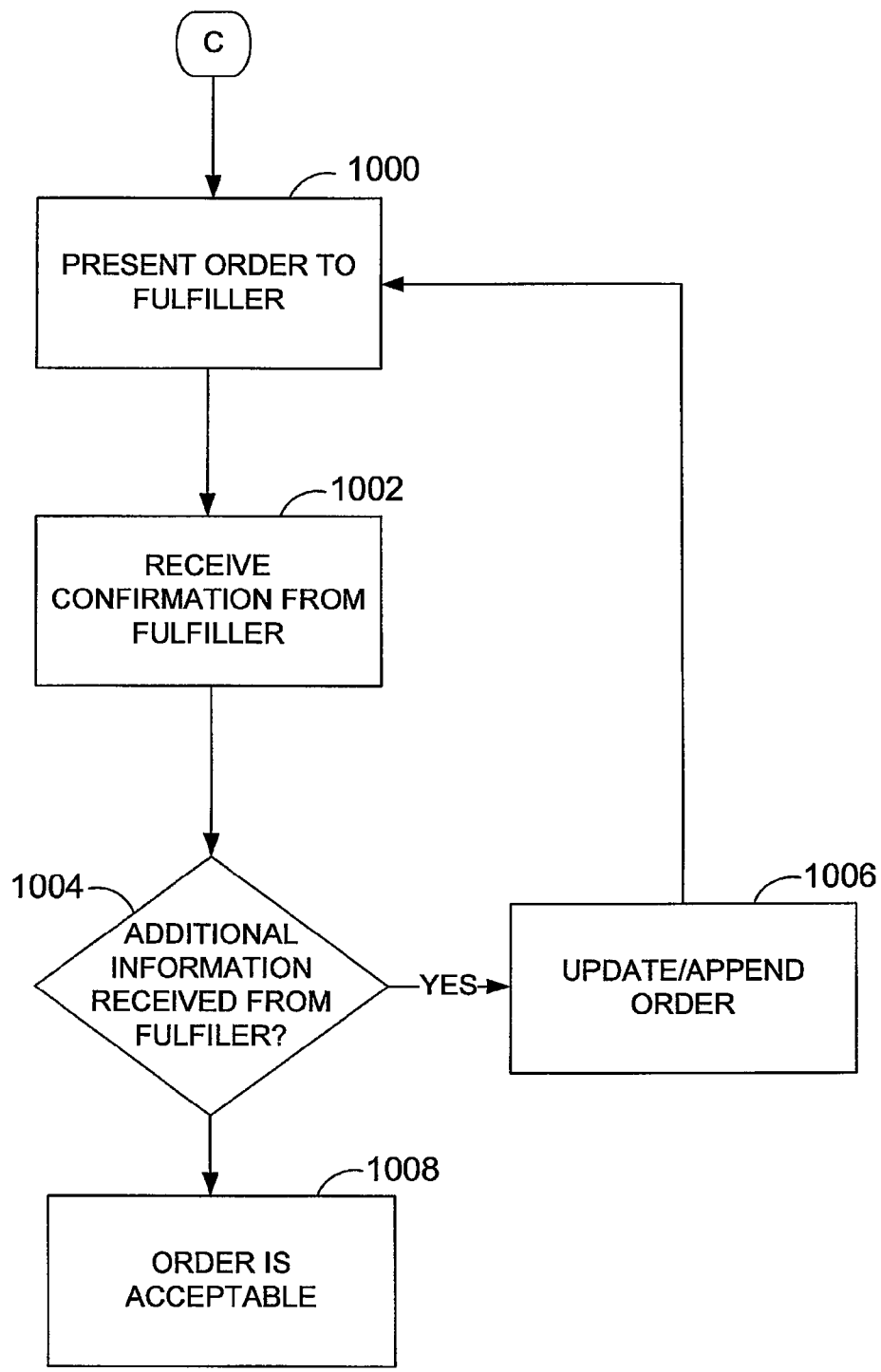

FIG. 10 is a flow chart of an embodiment for performing ordering step 512, which may include one or more of the ordering steps 512-1, 512-2, or 512-3 shown in FIG. 5. In this embodiment, the ordering step 512 includes presenting an order to be fulfilled to a fulfiller, as described in block 1000. Block 1002 includes receiving confirmation from the fulfiller. Confirmation information may include simply an acknowledgement that the order has been received or can include information that might affect the order with respect to other selections. In block 1004, it is determined whether additional information has been received from the fulfiller that might affect the current order. If so, the flow proceeds to block 1006 in which the order can be updated, changed, or appended. From block 1006, flow returns back to block 1000 to present the new order to the fulfiller(s). If it is determined in block 1004 that additional information has not been received, then the order is considered to be acceptable (block 1008).

Figure 11:
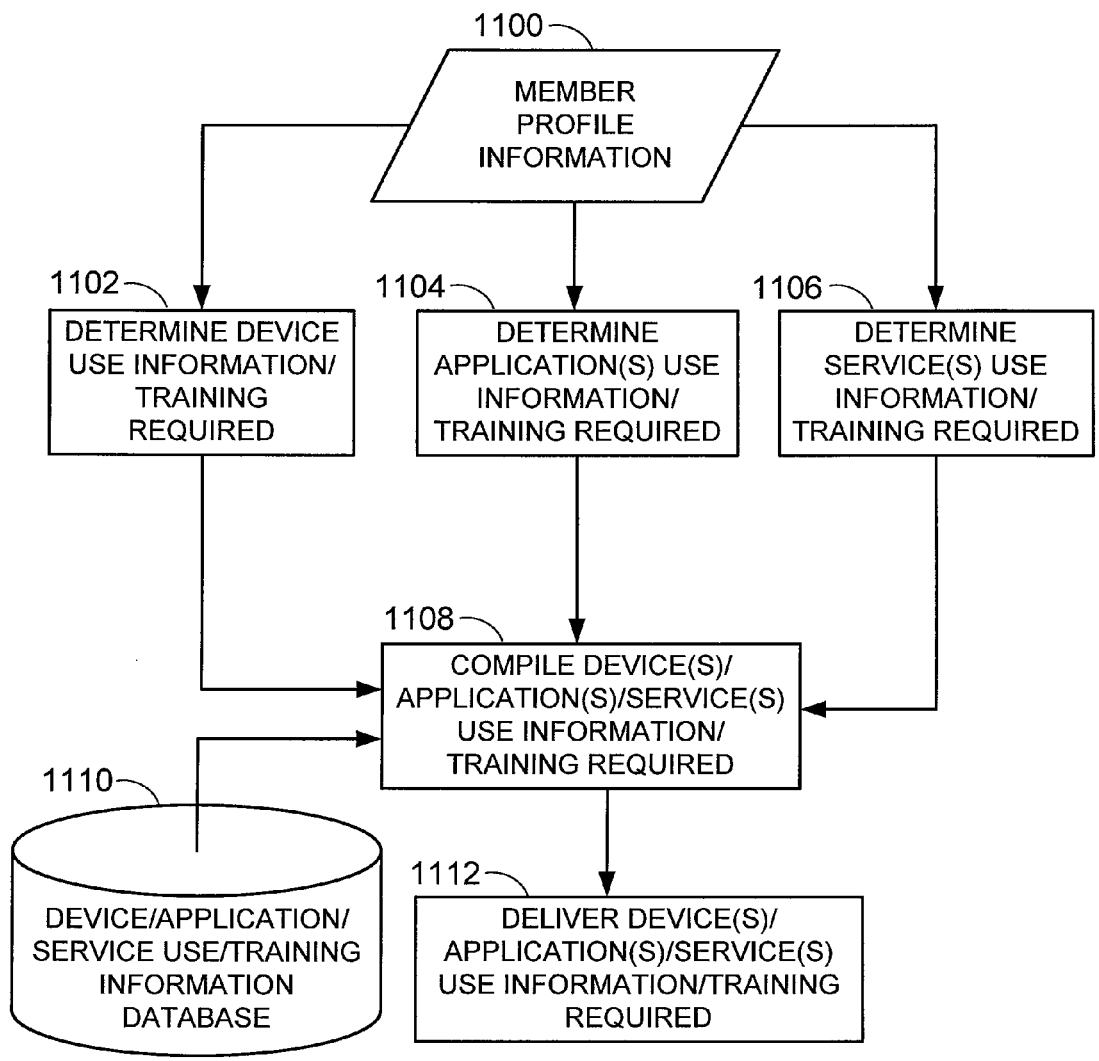

FIG. 11 is a flow chart of an embodiment for performing the member training/use step 524. In this embodiment, the member profile information block 1100, which at this point includes information about the device(s)/application(s)/service(s) (procured, provisioned and to be delivered to the member) is used to determine how the specific device(s) will be used and whether any training information is required (block 1102). The same determination is made for the application(s) (block 1104) and service(s) (block 1106). Block 1108 then uses this data to extract from a database the appropriate use/training materials (user manuals, training guides, on-line links to training tools, etc.) required by the member. In block 1112, these materials are packaged and delivered by one or more means to the member. Non-limiting examples include delivering the materials via physical mail, e-mail, etc.

Figure 12:
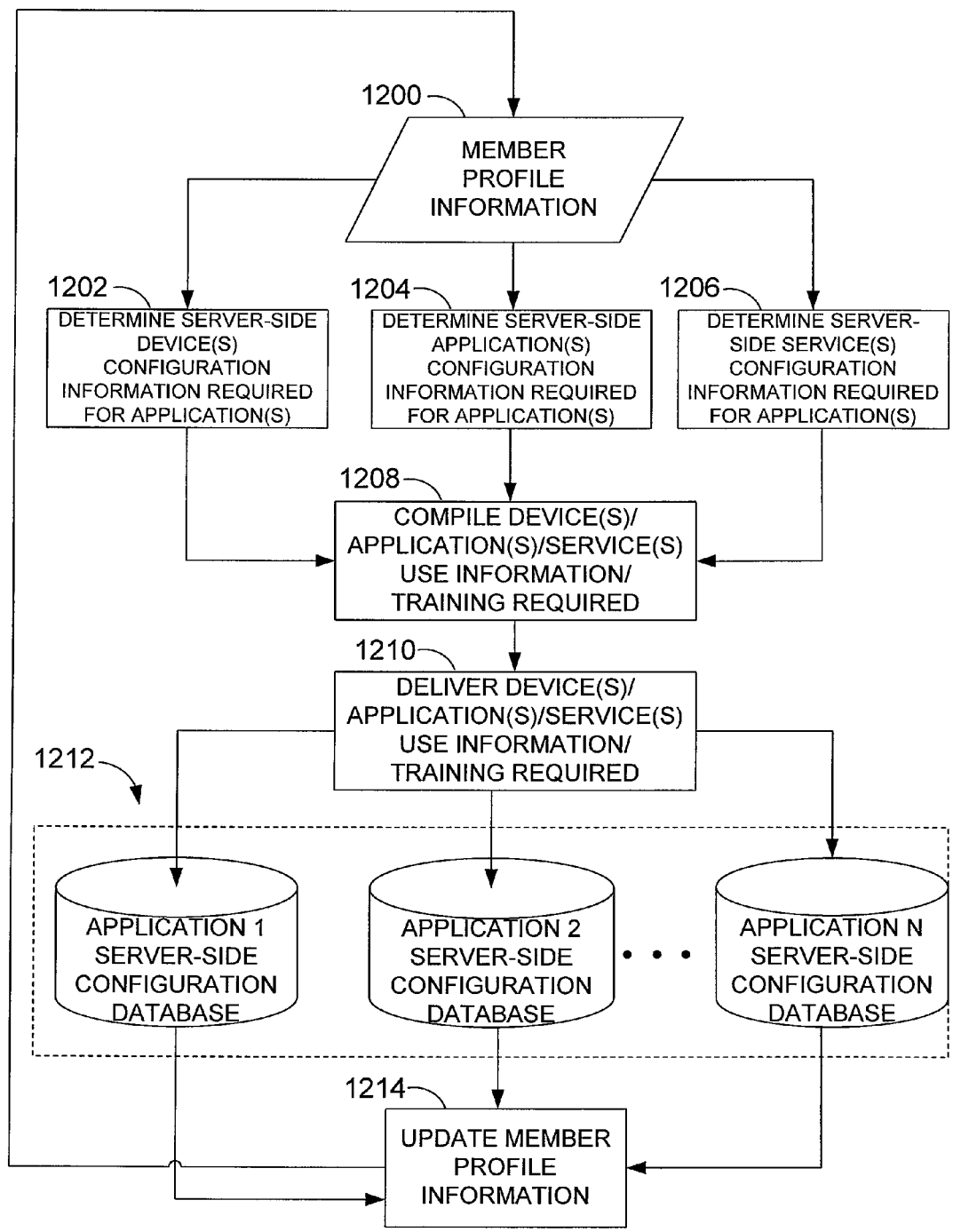

FIG. 12 is a flow chart of an embodiment for performing the server-side provisioning of member application(s) step 526. In this embodiment, the member profile information block 1200, which at this point includes information about the device(s)/application(s)/service(s) (procured, provisioned on the device and to be delivered to the member) is used to determine what specific device(s) (block 1202), application (s) (block 1204) and service(s) block (1206) profile/configuration information is required on the server-side of the application(s) being provided to the member. Block 1208 compiles this required configuration information, and block 1210 delivers this configuration to each server-side application (block 1212) through such non-limiting means as a SMTP (Simple Mail Transport Protocol) message delivered to an application administrator who then acts upon the message, directly exercising the administration console of the application via HTML (Hyptertext Markup Language), via an XML (Extensible Markup Language) file, or by some other API (application programming interface). In block 1214, the member profile information is updated with any additional information generated from the server-side application provisioning process.

Figure 13:
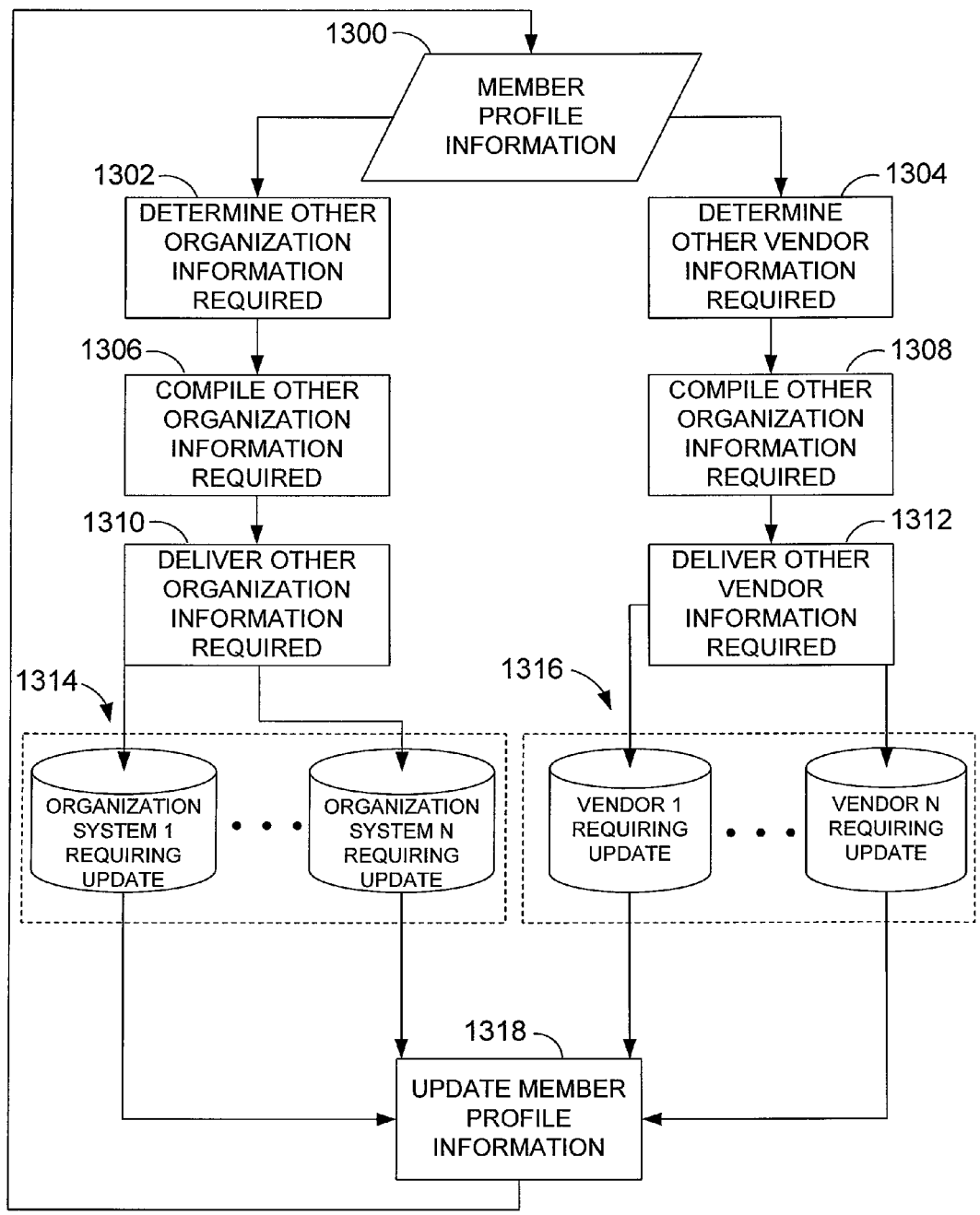

FIG. 13 is a flow chart of an embodiment for performing accounting for purchases made within the organization and with member(s) step 528. In this embodiment, the member profile information block 1300, which at this point includes information about the device(s)/application(s)/service(s) (procured and provisioned on the device and to be delivered to the member) is used to determine what specific device(s), application(s) and service(s) information is required by other system(s) within the organization and by any vendors involved in block 1304. Non-limiting examples include human resources, financial and accounting systems, and directory systems (block 1302). Block 1306 compiles the required information for the organization system(s), while block 1308 compiles the required information for the vendor (s). Block 1310 delivers this information to each organization system(s) block 1312, while block 1314 delivers this information to each vendor block 1316 requiring it through such non-limiting means as, physical mail delivery, SMTP (Simple Mail Transport Protocol) message delivered to an application administrator who then acts upon the message, directly exercising the administration console of the application via HTML (Hyptertext Markup Language), via an XML (Extensible Markup Language) file, or by some other API (application programming interface). In block 1318, the member profile information is update with any additional information generated from the process of updating the organization system(s) and vendor(s).

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method for allowing an individual to provision their wireless device with a computer connected to a network comprising the steps of:
   generating a request for a service and/or application to provision a wireless device associated with a member of an organization;
   receiving the request with a provisioning computer;
   identifying the member, the member having a member profile associated with the member;
   receiving a device indication sent to the provisioning computer;
   receiving a service indication sent to the provisioning computer;
   wherein the provisioning computer determines whether the member has authorization to obtain the requested service and/or application;
   wherein if the member has authorization to receive the requested service and/or application, the provisioning computer generates an order including the member profile, the device and service indications, and the requested service and/or application;
   transmitting the order from the provisioning computer to an entity computer configured to fulfill the order; and
   wherein the entity computer provisions the wireless device with the requested service and/or application.

2. The method of claim 1, further comprising the steps of:
   identifying a member, the member having a member profile saved on the computer and associated with the member; and
   generating a list of services and applications with the computer, the list of services and applications based on the member profile.

3. The method of claim 2, wherein receiving the service selection and the application selection from the member is performed by selecting from the list of devices, services and applications.

4. The method of claim 3, further comprising the steps of:
   receiving a request to procure at least one device,
   generating a list of compatible devices based on the application selection;
   receiving a device selection from the member based on the list.

5. The method of claim 1, wherein the step of generating an order comprises the steps of:
   sending an order for the service and/or application to the provisioning computer;
   approving the order based on the member profile; and
   sending the order from the computer to the entity computer.

6. The method of claim 5, wherein receiving approval is based on a set of rules on the provisioning computer defined by the organization, wherein the member is notified if the order is rejected.

7. The method of claim 1, wherein the provisioning computer performs the steps of:
   generating an invoice corresponding to the order; and
   forwarding the invoice to the organization.

8. The method of claim 1, wherein receiving a service selection further comprises determining whether the selected service is an existing service associated with the member,
   wherein if the selected service is an existing service, the existing service is transferred to the selected device;
   wherein if the selected service is a new service, the new service is provisioned for the selected device.

9. The method of claim 1, further comprising receiving confirmation from the one or more entities upon fulfilling the orders.

10. The method of claim 1, wherein the device is one of:
    a device adapted for wireless local area service,
    a device adapted for wireless wide area service, and
    a Fixed-Mobile Converged (FMC) device adapted for wireless local area network (WiLAN) service and wireless wide area network (WiWAN) service.

11. The method of claim 1, wherein the service comprises one of a local area service and a wide area service.

12. The method of claim 1, further comprising:
    accessing a database with the provisioning computer to determine compatibility between the device, the requested service and/or the requested application.

13. The method of claim 1, wherein the provisioning computer performs the steps of:
    examining the member profile to determine device use, application use, and service use;
    determining, based on the device use, application use, and service use, whether training information is to be sent to the member;
    extracting the training information from a training manual database; and
    delivering the training information to the member.

14. The method of claim 1, wherein the provisioning computer performs the steps of:
    examining the member profile to generate server-side configuration information for the device selection, the service selection, and the requested service and/or application;
    delivering the server-side configuration information to a server-side application administrator computer; and
    updating the member profile with information generated by the server-side application administrator computer.

15. The method of claim 14, wherein the server-side configuration information is delivered to the server-side application administrator computer by one of:
    a Hypertext Markup Language (HTML) file;
    an Extensible Markup Language (XML) file; and
    an application programming interface (API).

16. The method of claim 1, wherein the provisioning computer performs the steps of:
    examining the member profile to determine organization information required by the fulfilling entities and other members in the organization;
    compiling the organization information;
    delivering the organization information to the other members and to the fulfilling entities; and
    updating the member profile information.

17. The method of claim 16, wherein the organization information comprises accounting information related to procuring and provisioning the device with the service and/or the application.

18. The method of claim 16, wherein the organization information is delivered by one of Simple Mail Transport Protocol (SMTP) and physical mail delivery.

19. A method for allowing an individual to provision their wireless device with a computer connected to a network comprising the steps of:

transmitting a request for a service and/or application to a provisioning computer;

identifying the member associated with an organization;

transmitting an indication identifying the wireless device and service associated with the wireless device to the provisioning computer;

accessing a member profile associated with the identified member;

said provisioning computer determining if the member is entitled to the requested service and/or application based on a set of rules;

wherein if the provisioning computer determines that the member is entitled to the requested service and/or application, the provisioning computer generates an order for the requested service and/or application;

wherein the wireless device is provisioned with the requested service and/or application based on the generated order.

20. The method according to claim 19 wherein when a service is requested, the service request comprises a request for a service plan including: voice or data or combinations thereof.

21. The method according to claim 20 wherein the service request comprises a request for a service plan that is different from the transmitted service selection.

22. The method according to claim 19 wherein the requested application comprises software designed for operation on a wireless device.

23. The method according to claim 19 wherein the step of identifying the wireless device comprises identifying a type wireless device and the step of identifying the service comprises identifying a current service plan for the identified wireless device.

24. The method according to claim 19 wherein the provisioning computer performs the steps of:

generating an invoice corresponding to the order; and forwarding the invoice to the organization.

25. The method according to claim 19 wherein the provisioning computer performs the steps of:

examining the member profile to determine server-side configuration information for the identified the wireless device and service associated with the wireless device, and the requested service and/or application;

delivering the server-side configuration information to a server-side application administrator computer; and updating the member profile information with information corresponding to the server-side configuration information.

26. The method of claim 25, wherein the server-side configuration information is delivered to the server-side application administrator computer by one of:

a Hypertext Markup Language (HTML) file;

an Extensible Markup Language (XML) file; and an application programming interface (API).

* * * * *